(12) United States Patent
Frank et al.

(10) Patent No.: US 7,254,942 B2
(45) Date of Patent: Aug. 14, 2007

(54) TEMPERATURE-MONITORED HYDRODYNAMIC MACHINE

(75) Inventors: Anton Frank, Oberspeltach (DE); Kurt Adleff, Crailsheim (DE); Harald Hoffeld, Crailsheim (DE)

(73) Assignee: Voith Turbo GmbH & Co. KG, Heidenheim (DE)

( * ) Notice: Subject to any disclaimer, the term of this patent is extended or adjusted under 35 U.S.C. 154(b) by 36 days.

(21) Appl. No.: 11/052,681

(22) Filed: Feb. 7, 2005

(65) Prior Publication Data

US 2005/0198948 A1 Sep. 15, 2005

(30) Foreign Application Priority Data

Feb. 9, 2004 (DE) .................. 10 2004 006 358

(51) Int. Cl.
*F16D 33/02* (2006.01)
(52) U.S. Cl. ....................................................... 60/347
(58) Field of Classification Search .................. 60/347
See application file for complete search history.

(56) References Cited

U.S. PATENT DOCUMENTS

| 4,348,990 A | 9/1982 | Nolte et al. | |
|---|---|---|---|
| 4,581,892 A | 4/1986 | Ahrens et al. | |
| 5,909,157 A | 6/1999 | Tanaka et al. | |
| 6,101,810 A | 8/2000 | Adleff et al. | .................. 60/337 |
| 6,144,332 A | 11/2000 | Reindl et al. | .................. 342/42 |

FOREIGN PATENT DOCUMENTS

| DE | 29 38 706 | 4/1981 |
|---|---|---|
| DE | 42 00 076 | 8/1993 |
| DE | 42 17 049 | 11/1993 |
| DE | 196 14 589 | 10/1997 |
| DE | 101 40 220 | 5/2003 |
| WO | WO 97/09596 | 9/1996 |
| WO | WO 00/62029 | 3/2000 |

*Primary Examiner*—F. Daniel Lopez
(74) *Attorney, Agent, or Firm*—Baker & Daniels LLP

(57) ABSTRACT

A hydrodynamic machine with a turbo coupling comprising primary and secondary wheels together forming a torus shaped workspace, which can be filled with a working medium. A temperature-sensing device installed in a component, which rotates when the machine is operating, and sending a temperature —dependant signal. A stationary monitoring device connected to the temperature sensor in a remote query connection, and having means for creating a temperature measurement correction depending on the heating rate progression of the sensed temperature.

20 Claims, 5 Drawing Sheets

Figure 1:
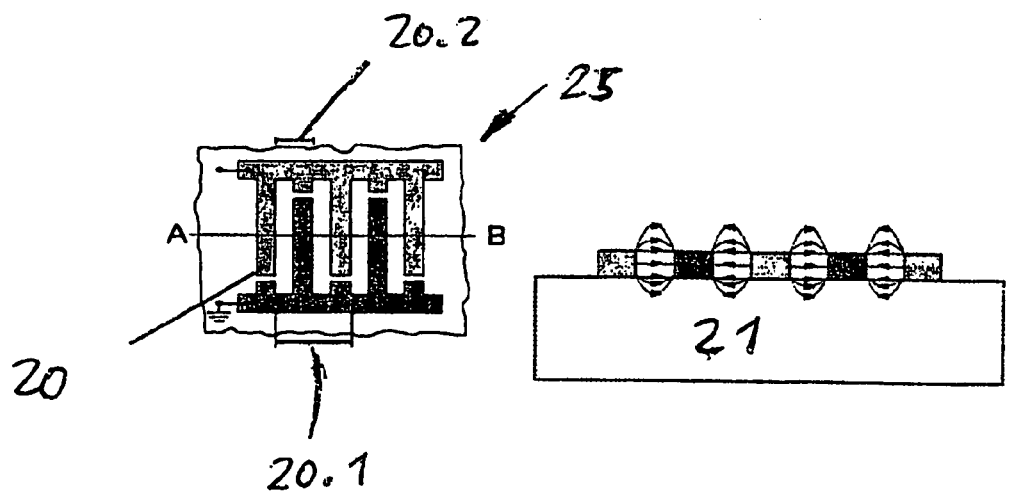

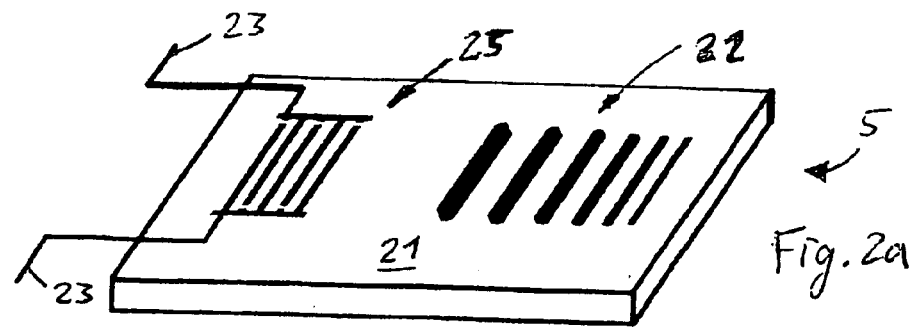
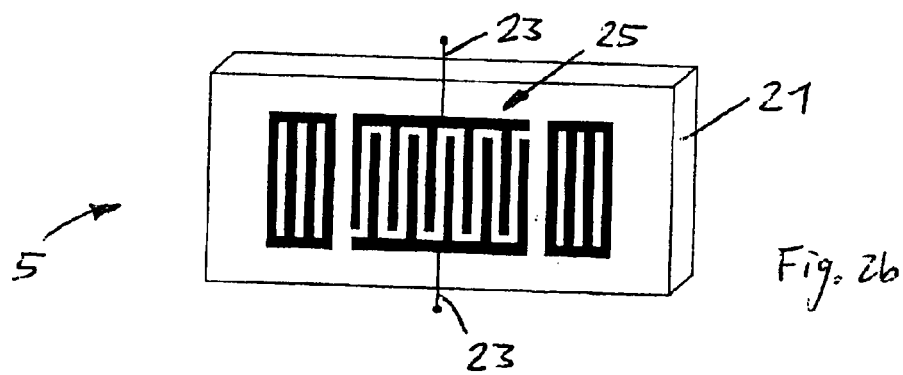
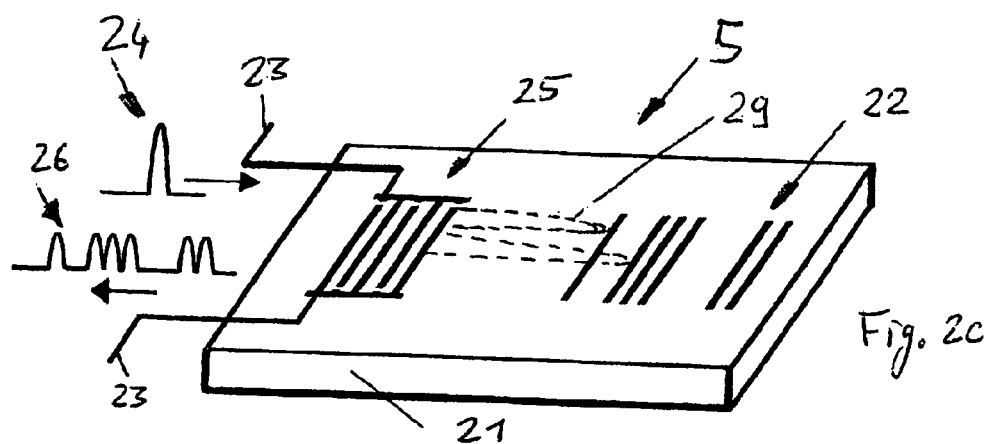
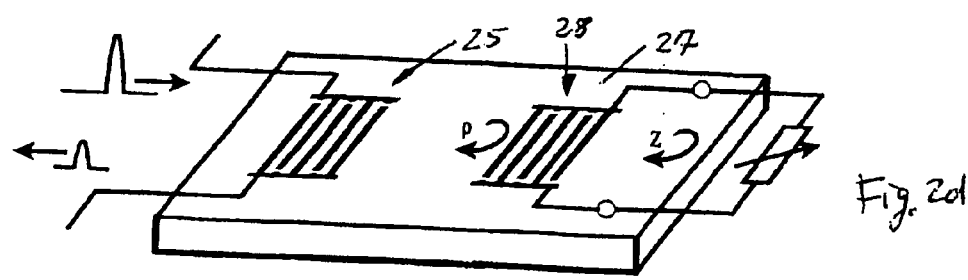

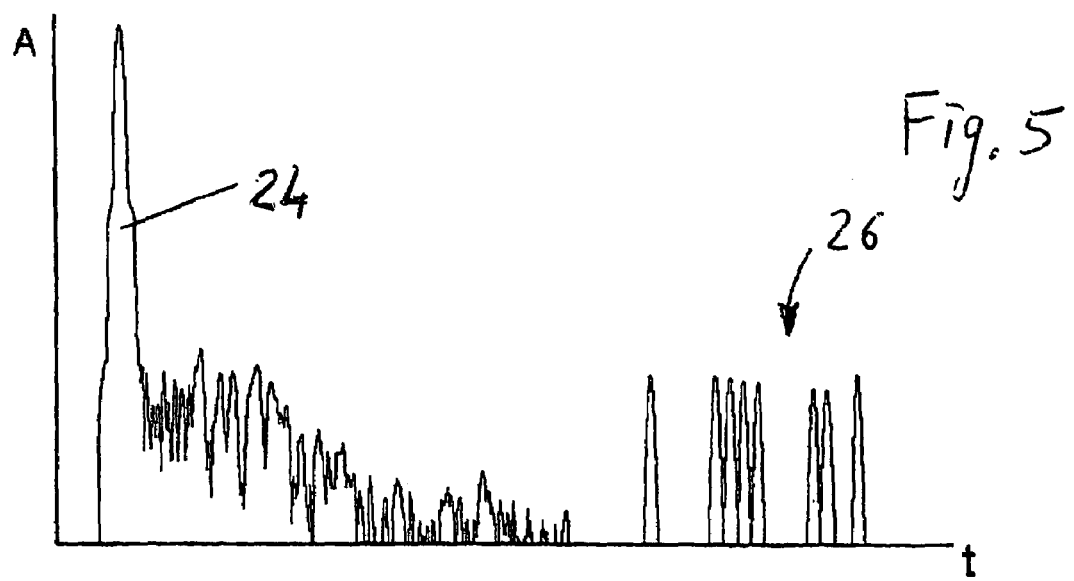

TEMPERATURE-MONITORED HYDRODYNAMIC MACHINE

The invention relates to a hydrodynamic machine, in particular a turbo coupling, which is temperature monitored while in service. This invention can, for example, also be used in hydrodynamic brakes (retarders) and hydrodynamic converters.

Hydrodynamic machines are known to have a primary wheel, also called a pump wheel in hydrodynamic couplings (turbo couplings), and a secondary wheel, also called a turbine wheel in turbo couplings. Together, the primary wheel and the secondary wheel form a workspace that is, as a rule, torus-shaped. The workspace can be filled with a working medium or, in some applications, also constantly filled. The working medium can, for example, be hydraulic oil, water, or a water mixture.

The working medium is correspondingly subject to the dissipated energy of a heating. The introduced heat can be dissipated to a certain extent. However, operating states continue to occur in which such a strong temperature increase can take place that it is necessary to monitor the temperature increase and, if necessary, arrange for a decrease in the temperature by reducing the drive power.

Conventional temperature monitoring takes place through passive control elements. A thermal contact is established between the control element and the operating fluid or the working medium, such as a turbo coupling. Below a predetermined operating temperature, the control element or a thermoswitch of the control element is closed. Above the operating temperature, the thermoswitch remains open until a subsequent temperature decrease closes it again. After it closes, the control element is ready for use again immediately.

Based on the special geometry, in particular of turbo couplings, it is necessary to insert the control element into a component that rotates during the coupling operation. Associated with this is the complexity of the cabling with, for example, an externally arranged analysis unit. In the end, the control elements should, as a rule, be implemented as completely passive elements; that is, they must get by without their own (internal) power supply.

Conventionally, these complexities have been solved by building a non-contact thermal switchgear into the turbo coupling. This thermal switchgear comprises a bimetal switch in a resonant circuit integrated in the rotating component. The resonant circuit comprises a coil. By means of an externally arranged initiator, which comprises an electrical oscillator, a high-frequency oscillation is created. As a frequency-determining element, the oscillator contains a resonant circuit, consisting of a coil and a capacitor. The resonant-circuit coil is housed in the head of a sensor, which is arranged opposite the control element at least part of the time. An alternating electromagnetic field escapes from the sensor head via the coil of the initiator.

The coil in the control element is coupled inductively with the coil in the initiator if the control element is located in front of the head of the initiator. Correspondingly, the stationary initiator and the rotating control element are arranged relative to each other, for example, in that the control element is screwed into the outer wheel of the turbo coupling and the initiator is mounted axially parallel to the turbo coupling.

When the thermoswitch is closed, energy from the initiator is transferred to the control element. The oscillator is dampened by the control element and has a lower current consumption. If the coupling temperature increases past the operating temperature of the control element, then the thermoswitch interrupts the electrical circuit in the control element. The control element can no longer dampen the oscillator in the initiator. By means of an analysis device attached to the initiator, which recognizes the damping of the initiator based on the initiator current consumption, this change, i.e. this lacking damping, is identified. The analysis device can thus initiate measures to decrease the temperature in the turbo coupling or simply output a warning message.

Hydrodynamic machines, in particular turbo couplings, have a high thermal dynamic. This means that abrupt and often unexpected events can occur that lead to a very rapid and strong increase in the temperature of the working medium. Since any temperature monitoring device has a certain inertness, it has traditionally been necessary to set the activation temperature, that is the critical temperature value at which warnings are to be output or measures must be initiated, distinctly below the actual maximum permissible temperature value. The difference between the activation temperature value and the value of the maximum permissible temperature must be defined based on the worse case scenario, i.e. based on the theoretical maximum possible temperature increase.

Due to continuously increasing demands on the potential operating capacity, especially in the case of hydrodynamic couplings, one quickly comes across the activation limits in the case of the use of conventional temperature monitoring. This is undesirable since the operating capacity is thus restricted.

The object of the invention is to present a hydrodynamic machine, in particular a hydrodynamic coupling, with temperature monitoring, which is improved with respect to the state of the art. In particular, the hydrodynamic machine should have a larger permissible operating range (operating capacity) without it having to be constructed in a more temperature-proof or temperature-stabile manner using expensive and complicated measures.

The invention is derived from the knowledge that the worse case assumption for the flat determination of the necessary difference between the maximum permissible temperature value and the activation temperature value leads to an unnecessary limitation of the permissible operating range. Thus, a decrease in this difference immediately leads to an expansion of the operating range, without requiring the selection of special materials for the machine or the change of the basic construction. Based on this knowledge, the inventors also recognized that an adjustment of the difference for an individual case is possible if the absolute temperature of the working medium or a desired reference point is determined in a rotating component of the hydrodynamic machine, instead of only a relative heating range as was used up to now. In accordance with the invention, this determined absolute temperature or signals, from which the absolute temperature, in particular without a lot of technical effort, can be determined, is/are sent from a temperature recording device arranged in the rotating part of the hydrodynamic machine so that they can be captured and evaluated by a stationary analysis unit. The analysis unit can be connected to a separate receive unit or contain one itself.

In accordance with a particularly advantageous embodiment of the invention, the temperature sensing device comprises a surface wave component (SAW component, also called a SAW element, i.e. Surface Wave Acoustic Element). These SAW elements are normally used in readable sensors. The functional principle of these sensors, as known to the expert, is as follows (e.g. see VDI, Reihe 8: Mess-, Steuerungs- und Regeltechnik Nr. 515, pp. 62-79, 1995, whereby the individual characteristics described there can be used within the framework of the present invention). Radio signals are sent from a query device. These are received by the sensor element via an antenna and are converted into surface waves. In the other direction, the surface waves modified by the effect of the measurement categories are—in particular, entirely passively—converted back into radio signals and received and evaluated by the analysis device.

Electromagnetic waves, for example, in the range of 50 MHz to 2.45 GHz can be used for contactless energy and data transfer. The radio sensor systems can thereby function at the transition between the near field and the far field of the transmit antennas. Since, with a constant antenna size, the antenna efficiency grows with increasing efficiency, these types of radio systems can reach ranges of several meters.

In order to separate the wanted signal from the query impulse and the environmental echoes in the receive or analysis unit, two especially effective separation mechanisms in particular can be used. A mechanism is the separation in the frequency domain, the other the separation in the time domain. In the case of separation in the frequency domain, the reply signal is at a different frequency than the query signal. Such a sensor system (here, the temperature capture device) can, for example, be implemented in the form of a small printed active switch with receive and transmit antennas as well as a semi-conductor sensor. For the separation in the time domain, a storage medium is provided that interim saves the received energy until the query signal and all environmental echoes have abated. This can advantageously take place in a high-quality resonant circuit. Another option for the interim saving is the use of wave types with much lower velocity of propagation than the speed of light. All named types can be used for the present invention.

In accordance with a first embodiment, the surface-waves component is designed in the form of an SAW sensor. The velocity of propagation of an acoustic SAW (surface wave) is normally only 3500 m/s. Acoustic surface-wave components therefore offer an excellent opportunity for saving this type of high-frequency impulse for a long time, until the electromagnetic environmental echoes have abated. The key element of this sensor system, i.e. the SAW sensor, is thus advantageously implemented as a passive, linear, acoustic surface-wave component. The propagation of these waves is concentrated on the boundary layer of a solid body. The amplitudes thereby decrease exponentially with increasing depth so that the largest part of the acoustic output is carried within a thin, approx. one wave-length-deep surface layer.

Piezoelectric crystals like quartz (SiO2), lithium niobate (LiNbO3), or lithium tantalate (LiTaO3), which more or less have temperature-dependent properties, can be used as solid bodies. In the case of low or no temperature dependency of the solid body itself, this can be achieved through additional measures, as will be described below.

The mode of operation of these types of SAW components is supposedly simple. An AC voltage is converted into a periodic deformation of the crystal surface based on the inverse piezo effect. This deformation disperses as an acoustic wave. Conversely, this surface wave can be reconverted into an electrical AC current via the piezo effect. This conversion is usually realized by means of so-called interdigital converters (latin: digitus=finger, inter=between) or converters, see FIG. 1. The electrode fingers 20 are connected in an electrically alternating manner, whereby an electrical period 20.1 that is twice as large as the geometric period results, i.e. like the finger periods 20.2.

In the case of a transmission, an electrical AC current activates surface waves based on the piezoelectricity. In the case of a reception, an incoming surface wave creates an electrical AC current due to the piezo effect. The piezoelectric substrate in FIG. 1 is labeled with the number 21. As can be seen, the substrate 21 can be implemented as a single piezoelectric crystal in the form of a rigid plate. As an alternative, a piezoelectric film that is applied, in particular glued, to another body, can also be provided.

The maximum of the electro-acoustic interdependency the mid—frequency of the converter—is the frequency $f_0$, at which the associated wave length $\lambda_0$ is the same as the electrical period q. With this frequency, all wave trains are added together constructively:

$$f_0 = \frac{v}{\lambda_0} = \frac{v}{q}$$

with v: velocity of propagation of the SAW.

The converter length determines the bandwidth, and the separation distance between the coupling-in and coupling-out converter determines the signal propagation delay.

Figure 1A:
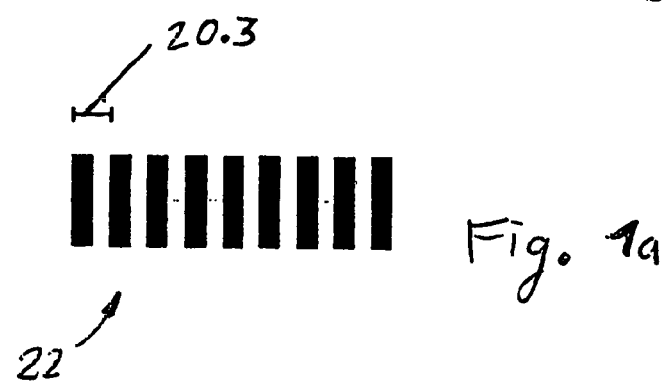

A part d of the surface wave is reflected on the mechanical and electrical discontinuity of a finger edge and on the changed electrical load during the transition between free and metallized surface. It is for this reason that a simple strip arrangement, as shown in FIG. 1a, can be used as the surface-wave reflector. When the reflector period 20.3 is commensurate with one half of the wave length λ, all reflections are constructively superimposed. The frequency at which a reflector is maximally reflected is the same as v divided by twice the reflector period.

An interdigital converter, as shown in FIG. 1, can, for example, be produced from electrode structures made of approx. 0.1-µm-thick aluminum in the form of interconnected fingers that were attached to the polished surface of the piezo crystal with a photolithographic process.

The surface-wave speed v and thus the mid-frequency $f_0$, and the group delay τ of a surface-wave component are dependent on the temperature of the substrate. The surface-wave component can thus be used as a temperature sensor:

$$v(T)=v(T_0)\cdot[1-S_T^v\cdot(T-T_0)]$$

$$f_0(T)=f_0(T_0)\cdot[1-S_T^v\cdot(T-T_0)]$$

$$\tau(T)=\tau(T_0)\cdot[1-S_T^v\cdot(T-T_0)]$$

with SvT: temperature dependency $T_0$: reference temperature.

In particular, three types of surface-wave elements have proven to be advantageously usable within the framework of the invention. This is an SAW element, which is designed as a reflective delay line, an SAW resonator, as well as a dispersive SAW structure. These types are described individually below. An additional, fourth type can also be employed within the scope of the present invention, namely as so-called SAW transponder for non-piezoelectric passive sensors. With this type, the substrate is made of a non-piezoelectric material and a temperature-dependent resistance is drawn on to change the load impedance, which in turn changes the reflection in value and/or phase.

In summary, it should be mentioned that basically any component, through which surface waves are transmitted and the distribution and/or reflection of which is temperature-dependent, can be used within the framework of the present invention.

In accordance with a further development of the invention, a monitoring device is assigned to the hydrodynamic machine and is connected with the temperature recording device in a remote enquiry connection, whereby the monitoring device includes a means for creating a temperature measurement value correction depending on the heating rate or the heating rate progression of the captured temperature. In particular, during the capture of the current heating rate, the measured value in a continuous measurement can be continuously corrected so that the assessment can take place with the actual temperature. The deviation depends in particular on the pulse frequency of the measurement. The measurement is advantageously executed with a pulse frequency of 1 second or less.

Such a temperature value correction has proven to be particularly advantageous where the heat capacity and thus the thermal inertness of the known SAW sensors were comparatively high despite adjustment for special use in hydrodynamic machines. Up to now, experts have been deterred from using SAW components in hydrodynamic machines, in particular turbo couplings, based on the known inertness of SAW sensors.

In accordance with a particularly advantageous embodiment, the captured heating rate is multiplied with a constant, which is particularly dependent on the temperature inertness of the temperature recording device and/or the position of the temperature recording device in the hydrodynamic machine. The result of this multiplication can be accepted as a good approximation for the temperature difference between the actual working medium temperature or the temperature of the reference point and the actual measured temperature. Thus, the addition of this product made up of constants and the heating rate to the captured (measured) temperature value leads to the desired corrected temperature value.

In accordance with an embodiment, a constant of 6 s was determined for a heating rate of 1 K/s. This means that if a turbo coupling is heated with 5 K/s, then the actual working-medium temperature is 30 K (5×6 K) higher than the measured value.

The advantage of the measured value correction is that it is possible to go up to the maximum permissible limit temperature for each heating rate without always basing it on a worst case assumption. Thus, the available operating capacity can be increased, in particular in the case of a turbo coupling, which is operated with high heating rates (blocking), with average hearing rates (approaching), as well as with low heating rates (nominal rating), since the overall heat capacity is always used up.

Even if a straight-line function with a zero-point passage for the correction had been described here, other functions can also be used depending on the application, like straight-light functions with an additional constant share, i.e. in which the straight line does not run through the zero point (origin point) of the coordinate system, or for example hyperbole functions.

The method according to the invention is characterized by the remote transmission of absolute temperature signals or signals from which an absolute temperature can be determined.

The invention is described in greater detail below using Figures, which have already been partially explained, in the form of exemplary embodiments.

Figure 3:
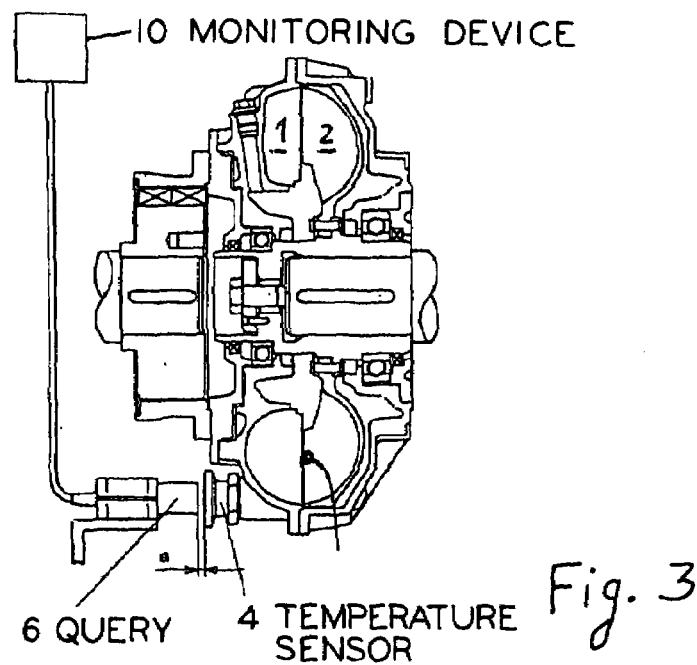
Figure 3A:
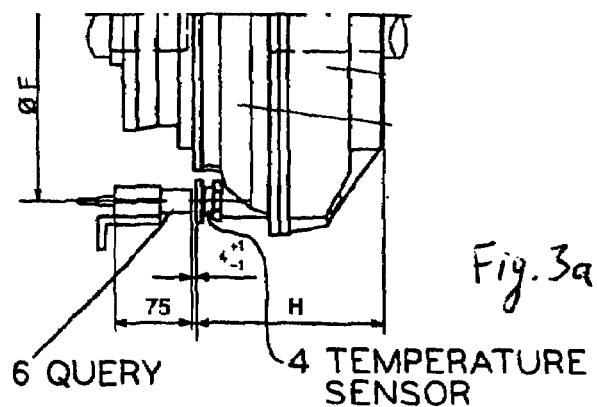
Figure 3B:
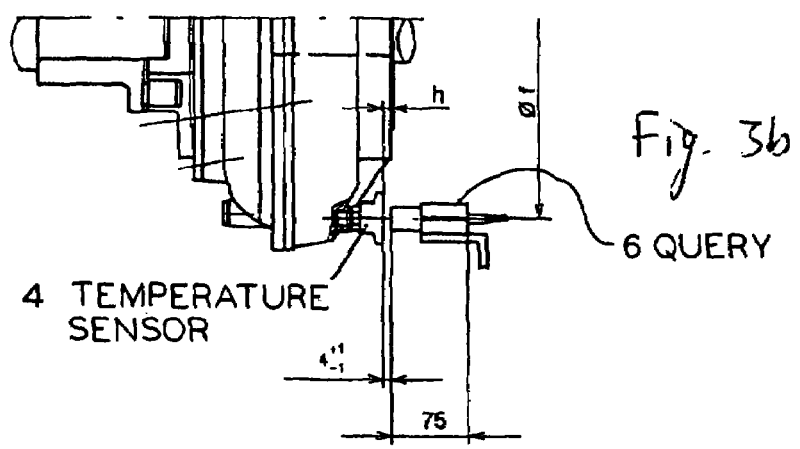
Figure 4:
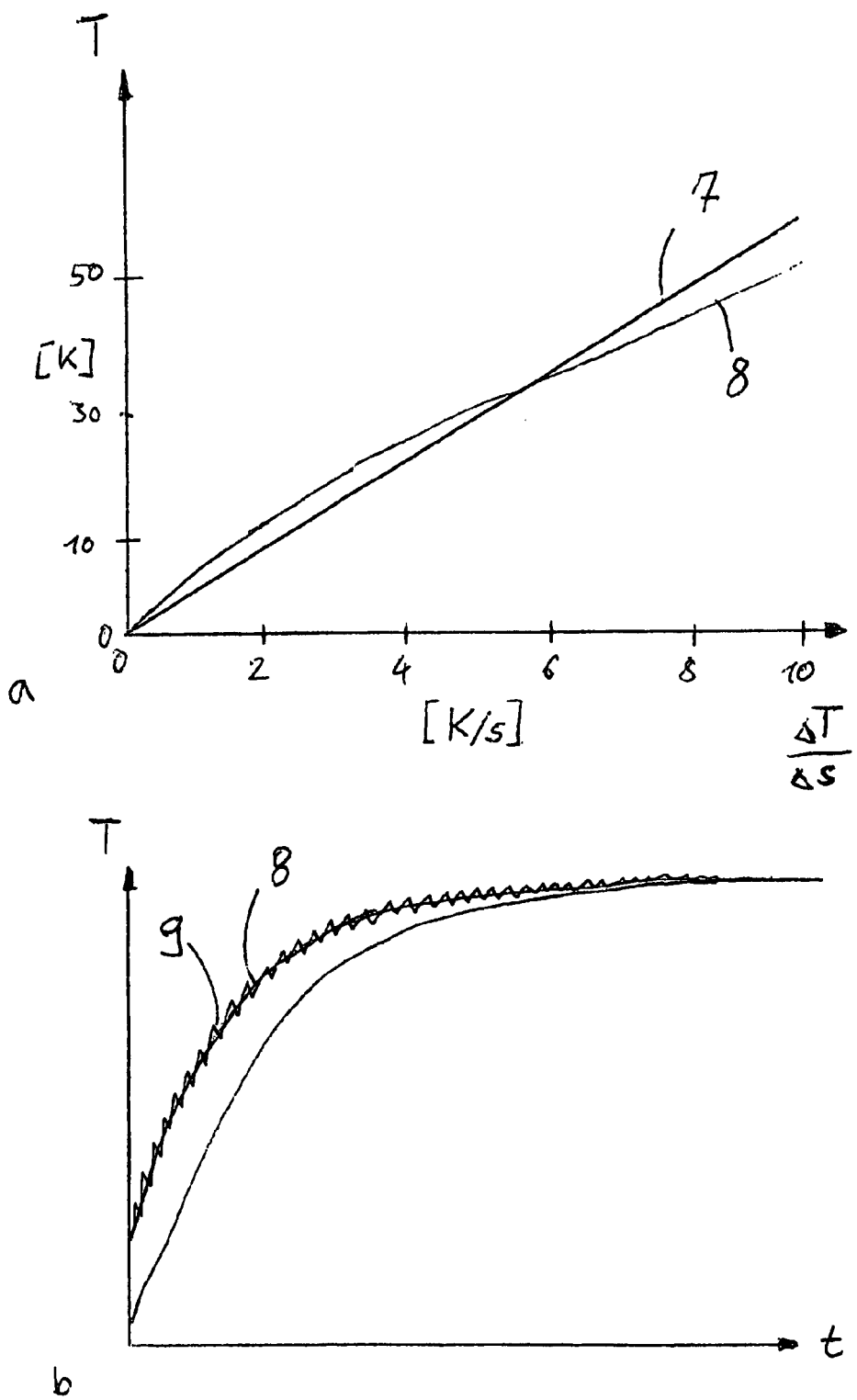

The following is shown:
FIG. 1 an SAW interdigital converter and SAW reflectors;
FIG. 1a a potential pattern for the reflector;
FIGS. 2a-2d different types of SAW components;
FIGS. 3, 3a and 3b a hydrodynamic coupling with a temperature recording device and an associated monitoring device as well as potential installation positions for the temperature recording device.
FIG. 4 a possible correction supplement as well as the actual and recorded temperature progression of the working medium of a turbo coupling;
FIG. 5 a reply signal from an SAW component in accordance with FIG. 2c.

FIG. 1 shows a surface-wave interdigital converter 25 with electrode FIG. 20, which were already described above. A potential pattern for a reflector 22 is also shown in FIG. 1a.

This type of reflector 22 can be implemented in a simple form with even distances, as shown in FIG. 1a, or also in a dispersive structure, as shown in FIG. 2a. In the case of this type of dispersive structure, the local period changes in reflector 22 and/or also in converter 25. In the dispersive or frequency-modulated reflector 22 shown in FIG. 2a, the deep frequencies for the coupling-in and coupling-out converters are reflected back. Through the implementation of an SAW element with a dispersive reflector and/or converter, the measurement effect, e.g. the temperature dependency, can be increased.

FIG. 2b shows an SAW component that is designed as a so-called SAW resonator. With this type of element, the available path is folded at least one time. However, it is conceivable that the achievable acoustic path for the surface wave can be folded several times if the transmit/send converter is arranged between the two fully reflective structures, i.e. a so-called SAW one-port resonator, as shown in FIG. 2b.

This type of SAW resonator sends a characteristic line spectrum back to the query or analysis device. Such SAW resonators achieve particularly high performances.

FIG. 2c shows an SAW resonator that is designed as a reflective delay line. It consists of a thin, small plate 21 of a piezoelectric crystal. This can, for example, be installed in a hermetically sealable housing. The electrical connections 23 are fed through this in order to connect the bus bars of the interdigital converter 25 with an antenna (not shown).

The electromagnetic high-frequency impulse 24 emitted by a query device is received by the antenna (not shown) of the surface-wave component 5 and converted by the converter 25 into a dispersing mechanical surface wave 29. Partially reflective structures, i.e. the reflectors 22, are inserted in the optical path of these surface waves 29. Thus, a multitude of pulses that are reflected back to the converter 25 are created from one single query impulse. There, they are converted back to electromagnetic waves and emitted as reply signal 26 by the antenna.

Based on the low velocity of propagation of the surface wave 29, the reflected, coded signal can be easily separated from all other electromagnetic reflection of the environment in the query device or the monitoring device. FIG. 5 shows a typical reply signal 24 and the environmental echoes. The binary high-frequency sensor reply 26 is ultimately received and analyzed in the query device or the monitoring device.

FIG. 2d shows an SAW transponder with a non-piezoelectric substrate 27. In accordance with this embodiment, a second converter 28 is provided as a reflector. The load impedance Z is changed depending on the temperature, whereby the reflected, acoustic impulse and thus also the reflected high-frequency impulse are changed in value and/or phase, which can be detected in the query device.

FIG. 3 shows a hydrodynamic coupling with a primary wheel 1 and a secondary wheel 2, which together form the workspace 3. A temperature sensing device 4 according to the invention is attached in the area of the outer diameter of the hydrodynamic coupling. It is located axially opposite a query device 6, whereby the latter is attached to a monitoring device 10. Of course, the query device 6 and the monitoring device 10 can also be designed integrally.

FIGS. 3a and 3b show potential installation positions of the temperature sensing device 4 and a corresponding configuration for the monitoring device 6. Thus, in accordance with FIG. 3a, the temperature sensing device according to the invention is arranged on the outer wheel side of the turbo coupling and on the shell side, in accordance with FIG. 3b. In general, it is possible to use the position of the conventional switch device.

FIG. 4a shows a calculation of a correction supplement in connection with the currently recorded heating rate. The correction supplement, i.e. the difference between the actual prevailing temperature in the working medium of a turbo coupling and the recorded temperature, is displayed above the heating rate. Curve 7 shows the approximation for the temperature supplement, which is implemented in the form of a straight line here. Curve 8 shows, for comparison, an experimentally recorded actual temperature progression. As can be seen, a linear equation is already a very good approximation.

Depending on the currently determined heating rate, the associated correction supplement will be added to the recorded temperature in order to thus arrive at the corrected measured temperature.

FIG. 4b shows a possible progression of the working-medium temperature in the workspace of a turbo coupling, again with reference number 8. Curve 9 shows the corrected measured temperature progression, which is shown jagged due to the query frequency of one second. Finally, the measures, uncorrected temperature progression can be seen below the two curves 8, 9. In the case of a rapid temperature increase, it lies in the left area of the diagram well below the corrected and actual progression and first approaches the actual and corrected temperature when the rate of the temperature increase falls. In a stationary state—the right half of FIG. 4b—the temperature increase is equal to 0, which thus leads to a correction supplement in the size of 0; i.e. the measured temperature, the corrected temperature, and the actual temperature coincide.

The invention claimed is:

1. A hydrodynamic machine with a turbo coupling, comprising:
   a primary wheel;
   a secondary wheel;
   the primary wheel and the secondary wheel together forming a torus-shaped workspace which can be filled with a working medium;
   a temperature sensing device installed in a component that rotates when the machine is in operation and sends a temperature-dependent signal to a monitoring device that is connected with the temperature sensing device in a remote query connection and which is assigned to the hydrodynamic machine;
   the signal comprising information for determining the absolute temperature of the working medium and/or a predetermined reference point in the rotating component;
   the monitoring device having a means for creating a temperature measurement correction depending on the heating rate progression of the sensed temperature.

2. The hydrodynamic machine in accordance with claim 1, wherein the temperature sensing device comprises a remotely readable surface-wave component.

3. The hydrodynamic machine in accordance with claim 2, wherein the surface-wave component is radio readable and is only supplied with power by query radio signals.

4. The hydrodynamic machine in accordance with claim 3, wherein the surface-wave component comprises a sensor of one of the following structure:
   reflective delay line
   SAW resonator
   dispersive SAW structure
   passive, non-piezoelectric transponder.

5. The hydrodynamic machine in accordance with claim 3 wherein the temperature sensing device is arranged in the shell and/or on the outer wheel side of the primary wheel or the secondary wheel axially mainly in the area of the largest diameter of the hydrodynamic machine.

6. The hydrodynamic machine in accordance with claim 2, wherein the surface-wave component comprises a sensor of one of the following structure:
   reflective delay line
   SAW resonator
   dispersive SAW structure
   passive, non-piezoelectric transponder.

7. The hydrodynamic machine in accordance with claim 6 characterized in that wherein the temperature sensing device is arranged in the shell and/or on the outer wheel side of the primary wheel or the secondary wheel axially mainly in the area of the largest diameter of the hydrodynamic machine.

8. The hydrodynamic machine in accordance with claim 2, wherein the temperature sensing device is arranged in the shell and/or on the outer wheel side of the primary wheel or the secondary wheel axially mainly in the area of the largest diameter of the hydrodynamic machine.

9. The hydrodynamic machine in accordance with claim 1, wherein the temperature sensing device is arranged in the shell and/or on the outer wheel side of the primary wheel or the secondary wheel axially mainly in the area of the largest diameter of the hydrodynamic machine.

10. A method for determining the temperature of the working medium or a reference point in a rotating component of a hydrodynamic machine with a turbo coupling, in accordance with claim 1, comprising the following steps:
    the temperature sensing device is activated for the output of signals that are temperature-dependent by means of a remote query; and
    the temperature-dependent signals are analyzed and the temperature to be determined is identified from this as an absolute value, wherein a correction is applied depending on the heating rate.

11. The method in accordance with claim 10, wherein the determined heating rate is multiplied by a predetermined constant, which depends on the thermal inertness of the temperature recording device, and the result of this multiplication is added to the measured temperature as the correction supplement.

12. The method in accordance with claim 11, wherein the temperature determination is executed continuously with a pulse frequency of one second or less.

13. A hydrodynamic machine with a turbo coupling, comprising:

a primary wheel;
a secondary wheel;
the primary wheel and the secondary wheel together form a torus-shaped workspace which can be filled with a working medium;
a temperature sensing device installed in a component that rotates when the machine is in operation and sends a temperature-dependent signal;
the signal comprising information for determining the absolute temperature of the working medium and/or a predetermined reference point in the rotating component; and
a stationary monitoring device assigned to the hydrodynamic machine and that is connected with the temperature sensing device in a remote query connection.

14. A hydrodynamic machine in accordance with claim 13, wherein the temperature sensing device comprises a remotely readable surface-wave component.

15. A hydrodynamic machine in accordance with claim 13, wherein the surface-wave component is radio readable and is only supplied with power by query radio signals.

16. A hydrodynamic machine in accordance with claim 13, wherein the surface-wave component comprises a sensor of one of the following structure:
reflective delay line
SAW resonator
dispersive SAW structure
passive, non-piezoelectric transponder.

17. A hydrodynamic machine in accordance with claim 13, wherein the temperature sensing device is arranged in the shell and/or on the outer wheel side of the primary wheel or the secondary wheel axially mainly in the area of the largest diameter of the hydrodynamic machine.

18. A method for determining the temperature of the working medium or a reference point in a rotating component of a hydrodynamic machine with a turbo coupling, in accordance with claim 13, comprising the following steps:
the temperature sensing device is activated for the output of signals that are temperature-dependent by means of a remote query; and
the temperature dependent signals are analyzed and the temperature to be determined is identified from this as an absolute value, by the stationary monitoring device.

19. A method in accordance with claim 18, wherein a correction is applied to the absolute value of the determined temperature, depending on the heating rate; wherein the determined heating rate is multiplied by a predetermined constant, which depends on the thermal inertness of the temperature sensing device, and the result of this multiplication is added to the measured temperature as the correction supplement.

20. The method in accordance with claim 18, wherein the temperature determination is executed continuously with a pulse frequency of one second or less.

* * * * *

UNITED STATES PATENT AND TRADEMARK OFFICE
CERTIFICATE OF CORRECTION

| | | |
|---|---|---|
| PATENT NO. | : 7,254,942 B2 | Page 1 of 1 |
| APPLICATION NO. | : 11/052681 | |
| DATED | : August 14, 2007 | |
| INVENTOR(S) | : Anton Frank et al. | |

It is certified that error appears in the above-identified patent and that said Letters Patent is hereby corrected as shown below:

Title Page, item [57]
Abstract, Line 6, delete "temperature –dependent" and insert
--temperature-dependent--

Claim 7, Column 8, Line 31, delete "characterized in that"

Signed and Sealed this

Twenty-fifth Day of December, 2007

JON W. DUDAS
*Director of the United States Patent and Trademark Office*